(12) United States Patent
Lawrence

(10) Patent No.: US 6,840,208 B2
(45) Date of Patent: Jan. 11, 2005

(54) DRIVE FOR ONE OR MORE ENGINE ACCESSORIES

(75) Inventor: Howard J. Lawrence, Shirley (GB)

(73) Assignee: Perkins Engines Company Limited, Peterborough ( * ) Notice: Subject to any disclaimer, the term of this patent is extended or adjusted under 35 U.S.C. 154(b) by 0 days.

(21) Appl. No.: 10/471,680

(22) PCT Filed: Mar. 18, 2002

(86) PCT No.: PCT/GB02/01067

§ 371 (c)(1),
(2), (4) Date: Sep. 12, 2003

(87) PCT Pub. No.: WO02/075133

PCT Pub. Date: Sep. 26, 2002

(65) Prior Publication Data

US 2004/0103870 A1 Jun. 3, 2004

(51) Int. Cl.[7] ................................................ F02B 75/06
(52) U.S. Cl. .................................................. 123/192.2
(58) Field of Search .......................... 123/192.2, 192.1, 123/195 A, 198 R, 90.31; 74/603, 604

(56) References Cited

U.S. PATENT DOCUMENTS 3,452,610 A * 7/1969 Whitehurst et al. .......... 74/15.2

FOREIGN PATENT DOCUMENTS

| DE | 2147213 | 4/1973 | |
|----|---------|--------|---|
| EP | 0243683 | 11/1987 | |
| EP | 0401710 | 12/1990 | |
| EP | 0754879 | 1/1997 | |
| EP | 0915267 | 5/1999 | |
| EP | 0916833 | 5/1999 | |
| GB | 1519554 | 8/1978 | |
| GB | 1584597 | 2/1981 | |
| JP | 61103025 | 5/1986 | |
| JP | 63259124 | 2/1989 | |
| JP | 05071586 A | * 3/1993 | ............ F16F/15/26 |
| JP | 5302524 | 2/1994 | |
| JP | 8021258 | 5/1996 | |

* cited by examiner

Primary Examiner—Tony M. Argenbright
Assistant Examiner—Hyder Ali
(74) Attorney, Agent, or Firm—John J Cheek

(57) ABSTRACT

Engine accessory drives are used with internal combustion engines to drive one or more accessories and are conventionally driven off a front end drive assembly. However, driving the accessories off the front end drive assembly has implications in respect of both increased engine noise and extended engine length. An engine accessory drive in accordance with this invention reduces engine noise and engine length. An engine accessory drive for transmitting a force between a first end (2) and a second end (3) of an engine (1) comprises a primary drive (18) locatable at the first end (2) of the engine.

17 Claims, 2 Drawing Sheets under accessories according to the invention, and

DRIVE FOR ONE OR MORE ENGINE ACCESSORIES

TECHNICAL FIELD

This invention relates to a drive for one or more engine accessories and, in particular, to a drive for transmitting force between the ends of an engine and to an engine including the drive.

BACKGROUND

In internal combustion engines of certain configurations, for example engines with four in-line cylinders, excitations are created from engine out-of-balance forces and couples or moments generated by the rotating and reciprocating engine component masses. These excitations may be undesirable, particularly in mobile vehicles into which the engines may be fitted.

The transmission of engine excitations into a vehicle may be reduced by means of flexible engine mountings, although it is desirable in some vehicles, such as frameless tractors, to incorporate balance shafts driven by the engine to counteract such excitations.

Balance shafts are typically driven by a dedicated drive from a gear located at the front end of a crankshaft, and thus it is usual for the balance shaft assemblies to be installed within the sump of an engine, to be closely adjacent to the crankshaft. The balance shaft assembly will thus take up space that could beneficially be used for oil containment. A balance shaft assembly located in a sump may also cause aeration of the engine lubricating oil and may further be difficult to access for servicing.

Engines are typically provided with front end accessories in the form of alternators, fans, power steering pumps, air conditioning pumps and the like. A front end accessory drive is typically provided by a pulley in communication with the engine crankshaft nose (i.e. externally of the engine). However, direct communication between the pulley and the crankshaft nose results in significant engine noise. More particularly the pulley, being typically disc or bell-like in construction, acts like a loud speaker to transmit engine noise from the engine.

Further, the crankshaft pulley is generally located at an end of the engine that is frequently relatively exposed to the radiator air intake opening of the vehicle, thus the engine noise emitted via a crankshaft pulley may add significantly to the vehicle's 'drive-by' noise.

Moreover, a seal must be provided at the front end of the engine at the crankshaft to prevent oil leakage and dirt ingress. However, such a seal is vulnerable to damage due to shaft rotation and dirt contamination.

The present invention sets out to overcome these and other disadvantages of the prior art.

SUMMARY OF THE INVENTION

According to the invention there is provided an engine accessory drive comprising a primary drive locatable at a first end of the engine; a first balance shaft externally mountable of the engine and drivable by said primary drive; a secondary drive locatable at a second end of the engine and drivable by said first balance shaft; a second balance shaft externally mountable of the engine and drivable by said secondary drive; and an engine accessory drivable by said secondary drive. The invention also encompasses an engine including such an engine accessory drive.

BRIEF DESCRIPTION OF THE DRAWINGS

Embodiments of the invention will now be described, by way of example only, with reference to the accompanying diagrammatic drawings, in which.

DETAILED DESCRIPTION

Figure 1:
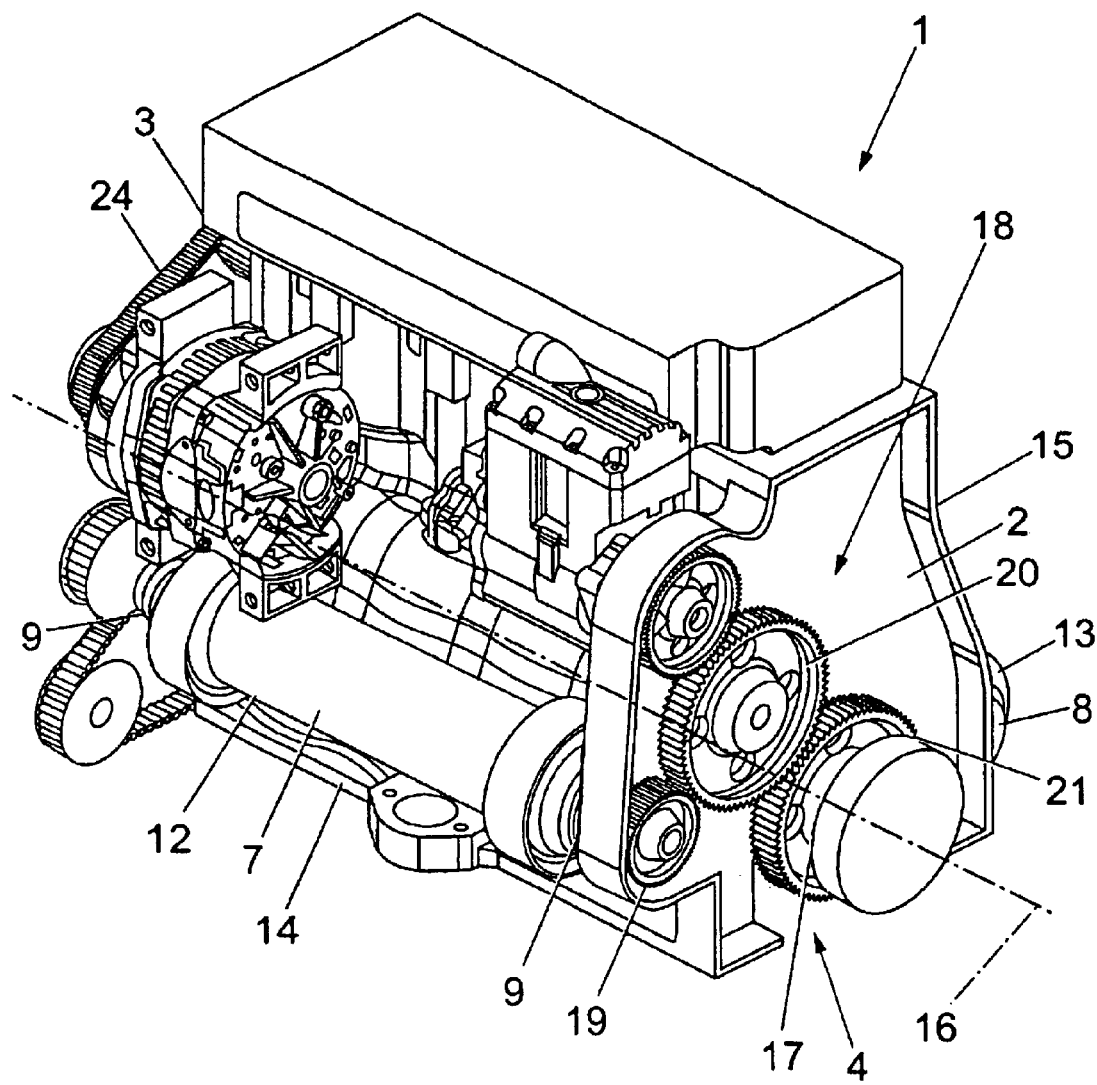
FIG. 1 is an isometric view from the rear of an engine provided with a drive for one or more front end accessories according to the invention.
Figure 2:
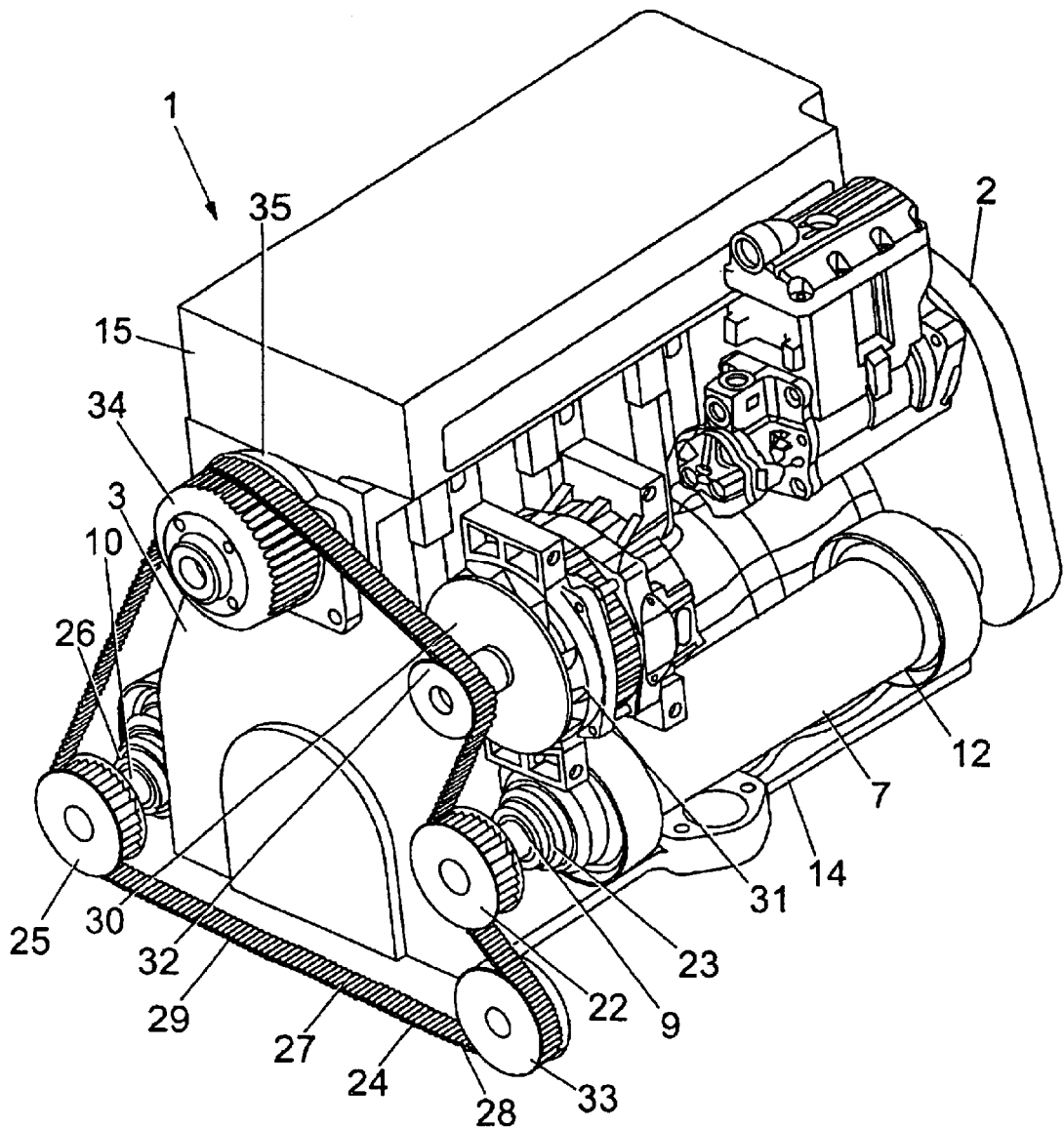
FIG. 2 is an isometric view from the front of the engine of FIG. 1.

FIGS. 1 and 2 show an engine 1, having a first end 2 and a second end 3, provided with a drive 4 of the invention. In the present embodiment the first end 2 of the engine 1 is a rear end 2 of the engine 1. The second end 3 of the engine 1 is a front end 3 of the engine 1. The drive 4 is located at the rear end 2 of the engine 1 and is therefore a rear end drive 4.

The engine 1 is provided with a first balance shaft assembly 7 and a second balance shaft assembly 8. The first and second balance shaft assemblies 7, 8 include, respectively, first and second balance shafts 9, 10 mounted in respective first and second tubular housings 12, 13. A balance shaft design that may be used with this invention is illustrated in commonly-owned British Patent Application No 0106852.7 filed on 20 Mar. 2001.

The first and second balance shaft assemblies 7, 8 are mounted on opposite first and second sides 14, 15 respectively of the engine 1 in a diametrically opposed configuration about a centreline 16 of a crankshaft 17 of the engine 1 and are offset vertically with respect to the centreline 16.

The first shaft 9 is in communication with a primary drive 18 in the form of a rear end drive assembly 18 of the drive 4 at the rear end 2. The rear end drive assembly 18 is located at the rear end 2 of the engine 1 between the engine and a flywheel (not shown). More particularly, the first shaft 9 is provided with a toothed drive gear 19 at a rear end thereof which meshes with an idler gear 20. The idler gear 20 in turn meshes with a crankshaft gear 21 mounted on a flywheel end of the crankshaft 17.

It will be appreciated that the primary drive 18 could take other forms. In particular the drive gear 19 could be driven directly from the crankshaft gear 21, or via any other gear train that is driven by the crankshaft 17 and located at or near the rear end 2 of the engine 1. For example, the drive gear 19 could mesh with a gear that is provided on a side 14 or 15 of the engine 1 at or near the rear end 2, the gear at the side 14 or 15 of the engine 1 typically being driven by the crankshaft 17 via appropriate internal or external gearing. The primary drive 18 could alternatively comprise or include a belt drive or a chain drive.

Thus the first balance shaft 9 is drivable by the rear end drive 4.

The first shaft 9 of the first balance shaft assembly 7 extends from the rear end 2 of the engine 1 to the front end 3 of the engine 1. Similarly, the second shaft 10 of the second balance shaft assembly 8 extends from the rear end 2 of the engine 1 to the front end 3 of the engine 1.

In use, as the crankshaft 17 is rotated in known manner, the crankshaft gear 21 drives the idler gear 20, which in turn drives the first balance shaft drive gear 19 to rotate the first balance shaft 9 of the first balance shaft assembly 7. The first balance shaft 9 transfers the torque imparted to it from the crankshaft gear 21 and idler gear 20 to the front end 3 of the engine 1. Thus, the first balance shaft 9 takes a driving force from the rear end 2 of the engine 1 and transmits or transfers the force to the front end 3 of the engine 1. As described further below, the driving force can be exploited at the front end 3 of the engine 1 to drive one or more engine accessories.

The first balance shaft 9 is provided with a toothed pulley 22 at a front end 23 thereof. A secondary drive 24 in the form of a synchronous toothed belt 24 extends between the toothed pulley 22 and a second toothed pulley 25 at a front end 26 of the second balance shaft 10 on the opposite side of the engine 1. The secondary drive 24 is therefore drivable by the first balance shaft 9, while the second balance shaft 10 is not driven directly by the rear end drive assembly 18 but by the toothed belt 24. As the balance shaft 9 is driven by the primary drive 18 of the engine 1, the drive is transferred to the front end 3 of the engine 1 via the balance shaft 9 and is used to drive the second balance shaft 10 via the synchronous belt 24. Thus the second balance shaft 10 is drivable by the secondary drive 24.

An engine accessory 30 in the form of an alternator 31 is located at the front end 3 of the engine over the first balance shaft assembly 7. The alternator 31 is provided with an alternator pulley 32 for engaging the belt 24, so that the alternator 31 is drivable by the secondary drive 24. A lower idler pulley 33 is mounted at the front end 3 of the engine 1 below the first balance shaft assembly 7. The lower idler pulley 33 may alternatively be an accessory drive pulley.

The front end 3 of the engine 1 is further provided with a water pump pulley 34 which facilitates passage of the synchronous belt 24 between the first balance shaft toothed pulley 22 and the alternator pulley 32. The water pump pulley 34 and the alternator pulley 32 are in communication with, respectively, a water pump 35 and the alternator 31 to drive the water pump and the alternator.

It will be appreciated that, in an alternative embodiment of the invention, the second balance shaft 10 could be directly driven by the rear end drive assembly 18.

The belt 24 is provided with teeth 27 on a top face 28 and a bottom face 29 thereof so that the first and second balance shafts 9, 10 of the first and second balance shaft assemblies 7, 8 can be contra-rotated.

It will be appreciated by those skilled in the art that the drive of the invention can drive other accessories 30 such as a fan, power steering pump, air conditioning pump, oil pump or the like.

The rear end drive assembly 18 of the engine 1 including the first balance shaft drive pulley 19, the idler pulley 20 and the crankshaft pulley 21 is configured so that the first shaft 9 of the first balance shaft assembly 7 is driven at twice engine speed.

As the first and second balance shafts 7, 8 are driven from the rear end 2 of the engine 1, there is no requirement to have a conventional crankshaft pulley at the front end 2. Thus, the front end of the engine 1 can be sealed more easily. Also, as no drive is being taken off the front end of the crankshaft 17, the conventional rotary seal that is typically used to seal the front end of the crankshaft 17 is not required.

As this conventional seal is not required, and the conventional front end drive assembly is also not required, the engine can be made shorter. This is a particular advantage as engine manufacturers are being pressed to provide smaller engines whilst maintaining power output.

INDUSTRIAL APPLICABILITY

The drive of the invention finds application in engines where it is desired to eliminate a conventional front end drive assembly to reduce engine noise and to reduce engine length.

The invention finds particular application in engines employing balance shafts where the balance shafts can be driven from the rear of the engine yet transfer power between the rear of the engine and the front of the engine. In an in-line four-cylinder engine, the balance shafts are required to rotate at twice engine speed, hence the load transmitted by pulley 22 to the synchronous belt 24 at any given point in time will be less than if the pulley 22 were rotating at a lower relative speed.

The drive of the invention also releases the front end of the engine to make the crankshaft available as a power take-off point for accessories such as a gearbox, pump or the like if desired. However, this would entail the introduction of a crankshaft oil seal, thus negating some of the advantage of the invention.

Modifications and improvements may be made to the foregoing without departing from the scope of the present invention.

What is claimed is:

1. An engine accessory drive comprising:
   a primary drive locatable at a first end of the engine; a first balance shaft externally mountable of the engine and drivable by said primary drive;
   a secondary drive locatable at a second end of the engine and drivable by said first balance shaft;
   a second balance shaft externally mountable of the engine and drivable by said secondary drive; and
   an engine accessory drivable by said secondary drive.

2. An engine accessory drive as claimed in claim 1, wherein said first and second balance shafts are arranged for contra-rotation.

3. An engine accessory drive as claimed claim 2, wherein said secondary drive includes a synchronous belt extending between said at least one shaft and the accessory.

4. An engine accessory drive as claimed in claim 3, wherein the first end of the engine is a rear end of the engine, and the second end of the engine is a front end of the engine.

5. An engine accessory drive as claimed in claim 2, wherein the first end of the engine is a rear end of the engine, and the second end of the engine is a front end of the engine.

6. An engine accessory drive as claimed in claim 2, wherein the primary drive includes one of a gear drive, a belt drive, and a chain drive.

7. An engine accessory drive as claimed claim 2, wherein said first balance shaft is provided with a toothed pulley at a second end thereof.

8. An engine accessory drive as claimed in claim 1 wherein said secondary drive includes a synchronous belt extending between said at least one shaft and the accessory.

9. An engine accessory drive as claimed in claim 8, wherein the first end of the engine is a rear end of the engine, and the second end of the engine is a front end of the engine.

10. An engine accessory drive as claimed in claim 8, wherein the primary drive includes one of a gear drive, a belt drive, and a chain drive.

11. An engine accessory drive as claimed claim 8, wherein said first balance shaft is provided with a toothed pulley at a second end thereof.

12. An ngine accessory drive as claimed in claim 1, wherein the first end of the engine is a rear end of the engine, and the second end of the engine is a front end of the engine.

13. An engine accessory drive as claimed in claim 12, wherein the primary drive includes one of a gear drive, a belt drive, and a chain drive.

14. An engine accessory drive as claimed claim 12, wherein said first balance shaft is provided with a toothed pulley at a second end thereof.

15. An engine accessory drive as claimed in claim 1, wherein the primary drive includes one of a gear drive, a belt drive, and a chain drive.

16. An engine accessory drive as claimed claim 15, wherein said first balance shaft is provided with a toothed pulley at a second end thereof.

17. An engine accessory drive as claimed claim 1, wherein said first balance shaft is provided with a toothed pulley at a second end thereof.

* * * * *

UNITED STATES PATENT AND TRADEMARK OFFICE
CERTIFICATE OF CORRECTION

PATENT NO. : 6,840,208 B2
DATED : January 11, 2005
INVENTOR(S) : Howard J. Lawrence It is certified that error appears in the above-identified patent and that said Letters Patent is hereby corrected as shown below:

Title page,
Item [56], References Cited, FOREIGN PATENT DOCUMENTS,
delete "GB 1519554" and insert -- GB 1519564 --.

Column 4,
Lines 25, 37, 49, 58, 64 and 67, after "claimed" insert -- in --.
Line 52, delete "ngine" and insert -- engine --.

Signed and Sealed this

Twenty-eighth Day of February, 2006

JON W. DUDAS
*Director of the United States Patent and Trademark Office*